United States Patent
Fan et al.

(10) Patent No.: US 9,200,722 B2
(45) Date of Patent: Dec. 1, 2015

(54) BALANCED PORT SENSE PROFILE FOR IMPROVED CAPACITY PERFORMANCE

(71) Applicant: EMERSON PROCESS MANAGEMENT REGULATOR TECHNOLOGIES, INC., McKinney, TX (US)

(72) Inventors: GuoLei Fan, Sichuan (CN); Biao Zhou, Sichuan (CN); Jason S. Mevius, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 173 days.

(21) Appl. No.: 13/797,075

(22) Filed: Mar. 12, 2013

(65) Prior Publication Data

US 2014/0261724 A1  Sep. 18, 2014

(30) Foreign Application Priority Data

Sep. 28, 2012 (CN) .......................... 2012 1 0377053

(51) Int. Cl.
*F16K 31/12* (2006.01)
*F16K 31/126* (2006.01)
*F16K 1/36* (2006.01)

(52) U.S. Cl.
CPC ............. *F16K 31/1262* (2013.01); *F16K 1/36* (2013.01); *F16K 31/126* (2013.01); *Y10T 137/0402* (2015.04); *Y10T 137/7756* (2015.04)

(58) Field of Classification Search
CPC ........... F16K 31/1262; F16K 31/1266; F16K 39/022; F16K 31/126; F16K 1/36; G05D 16/063; G05D 16/0638; G05D 16/0688; Y10T 137/0402; Y10T 137/7756

USPC ............... 137/484.6, 484.8, 505.13, 505.18, 137/505.44, 505.46, 505.47, 505.15; 251/356

See application file for complete search history.

(56) References Cited

U.S. PATENT DOCUMENTS

| | | | |
|---|---|---|---|
| 389,032 A * | 9/1888 | Westinghouse, Jr. ..... | 137/505.13 |
| 1,143,225 A * | 6/1915 | Platt .............................. | 251/356 |

(Continued)

FOREIGN PATENT DOCUMENTS

WO    WO-2012/126183 A1    9/2012

OTHER PUBLICATIONS

International Search Report received in International (PCT) Application PCT/US2013/062118 by the European Patent Office, dated Jan. 21, 2014.

(Continued)

*Primary Examiner* — Jessica Cahill
(74) *Attorney, Agent, or Firm* — Marshall, Gerstein & Borun LLP

(57) ABSTRACT

A fluid regulating device includes a regulator valve having an inlet, an outlet, and a valve port disposed between the inlet and the outlet. An actuator is coupled to the regulator valve and includes a valve disc that displaces along a longitudinal axis to open and close the fluid regulating device. The valve disc includes a sealing surface disposed adjacent to an outer radial end of the valve disc, and the sealing surface is adapted to sealingly engage the valve port in the closed position. The valve disc also includes an intermediate surface disposed inward of the sealing surface, and a groove is formed in the intermediate surface. The groove extends along a groove axis extending along the intermediate surface normal to the longitudinal axis, and the groove axis is at least partially curved when viewed along the longitudinal axis.

21 Claims, 4 Drawing Sheets

(56) References Cited

U.S. PATENT DOCUMENTS

| | | | | |
|---|---|---|---|---|
| 1,646,640 | A * | 10/1927 | Daniel | 251/24 |
| 2,678,187 | A * | 5/1954 | Peters | 251/357 |
| 3,623,699 | A * | 11/1971 | Matousek et al. | 251/330 |
| 4,300,595 | A * | 11/1981 | Mayer et al. | 137/625.33 |
| 4,770,206 | A * | 9/1988 | Sjoberg | 137/516.29 |
| 6,276,392 | B1 * | 8/2001 | Hendrickson | 137/505.38 |
| 2009/0260697 | A1 * | 10/2009 | Mevius et al. | 137/484.2 |
| 2010/0071786 | A1 * | 3/2010 | Hawkins et al. | 137/485 |
| 2011/0284102 | A1 * | 11/2011 | Schneider | 137/505.47 |

OTHER PUBLICATIONS

Written Opinion for Application PCT/US2013/062118 by the European Patent Office, dated Jan. 21, 2014.

* cited by examiner

BALANCED PORT SENSE PROFILE FOR IMPROVED CAPACITY PERFORMANCE

FIELD OF THE INVENTION

The present invention relates to fluid flow regulating devices such as gas regulators and, more particularly, to gas regulators having a balanced trim assembly.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a balanced trim to improve the reaction of the gas regulator to variations in the downstream pressure. The balanced trim is adapted to reduce the influence of the upstream pressure on the performance of the gas regulator. In conventional regulators having a balanced trim, fluid travels from the inlet to the outlet through a valve port when a sealing surface of a valve disc is longitudinally displaced from a seating surface of the valve port. As fluid flows through the valve port, the fluid acts of the planar face of the valve disc. A portion of the fluid flowing through the valve port may travel through channels disposed through the planar face of the valve disc and that longitudinally extend through the valve disc, and the channels open to a balancing cavity that is at least partially defined by the balancing diaphragm. So configured, upstream pressure is placed in fluid communication with the balancing diaphragm to apply a force to the valve disc of the gas regulator in the opposite direction as the force of the downstream pressure (i.e., a "boost"). Accordingly, as the upstream pressure varies, a corresponding force is applied to balance the force created by the upstream pressure as described further below so that the gas regulator acts in response to the downstream pressure only. Such a configuration provides for a high "boost" at a low inlet pressure, thereby resulting in the undesirable reduction of capacity through the regulator. The configuration also provides for a low "boost" at a high inlet pressure, thereby resulting in the undesirable increase of capacity through the regulator.

SUMMARY

A fluid regulating device includes a regulator valve having an inlet, an outlet, and a valve port disposed between the inlet and the outlet. An actuator is coupled to the regulator valve and includes a valve disc, the valve disc being disposed within the regulator valve and adapted for displacement along a longitudinal axis between a closed position sealingly engaging the valve port and an open position disposed away from the valve port. The valve disc includes a sealing surface disposed adjacent to an outer radial end of the valve disc, the sealing surface being adapted to sealingly engage the valve port in the closed position. The valve disc also includes an intermediate surface disposed inward of the sealing surface. The valve disc further includes a groove formed in the intermediate surface. The groove extends along a groove axis extending along the intermediate surface normal to the longitudinal axis, and the groove axis is at least partially curved when viewed along the longitudinal axis.

In a further embodiment, a fluid regulating device includes a regulator valve having an inlet, an outlet, and a valve port disposed between the inlet and the outlet. An actuator is coupled to the regulator valve and includes a valve disc, the valve disc being disposed within the regulator valve and adapted for displacement along a longitudinal axis between a closed position sealingly engaging the valve port and an open position disposed away from the valve port. The valve disc includes a sealing surface disposed adjacent to an outer radial end of the valve disc, and the sealing surface is adapted to sealingly engage the valve port in the closed position. The valve disc further includes an intermediate surface disposed radially inward of the sealing surface, wherein the intermediate surface extends along the longitudinal axis towards the valve port.

A method of tuning a balanced trim assembly of a fluid regulating device includes selecting a balancing spring from a plurality of balancing springs, wherein each of the plurality of balancing springs has a unique spring force. The method also includes positioning the balancing spring within a fluid regulating device such that the balancing spring biases a valve disc of the balanced trim assembly away from a valve port and into an open position. The valve disc includes one of (1) a groove formed in an intermediate surface of the valve disc that is disposed inward of a sealing surface adapted to sealing engage the valve port in a closed position, the groove extending along a groove axis extending along the intermediate surface normal to a longitudinal axis extending through the valve disc, the groove axis being at least partially curved when viewed along the longitudinal axis, and (2) an intermediate surface disposed radially inward of a sealing surface adapted to sealing engage the valve port in a closed position, wherein the intermediate surface includes a protrusion that extends along a longitudinal axis extending through the valve disc.

DETAILED DESCRIPTION

Figure 1:
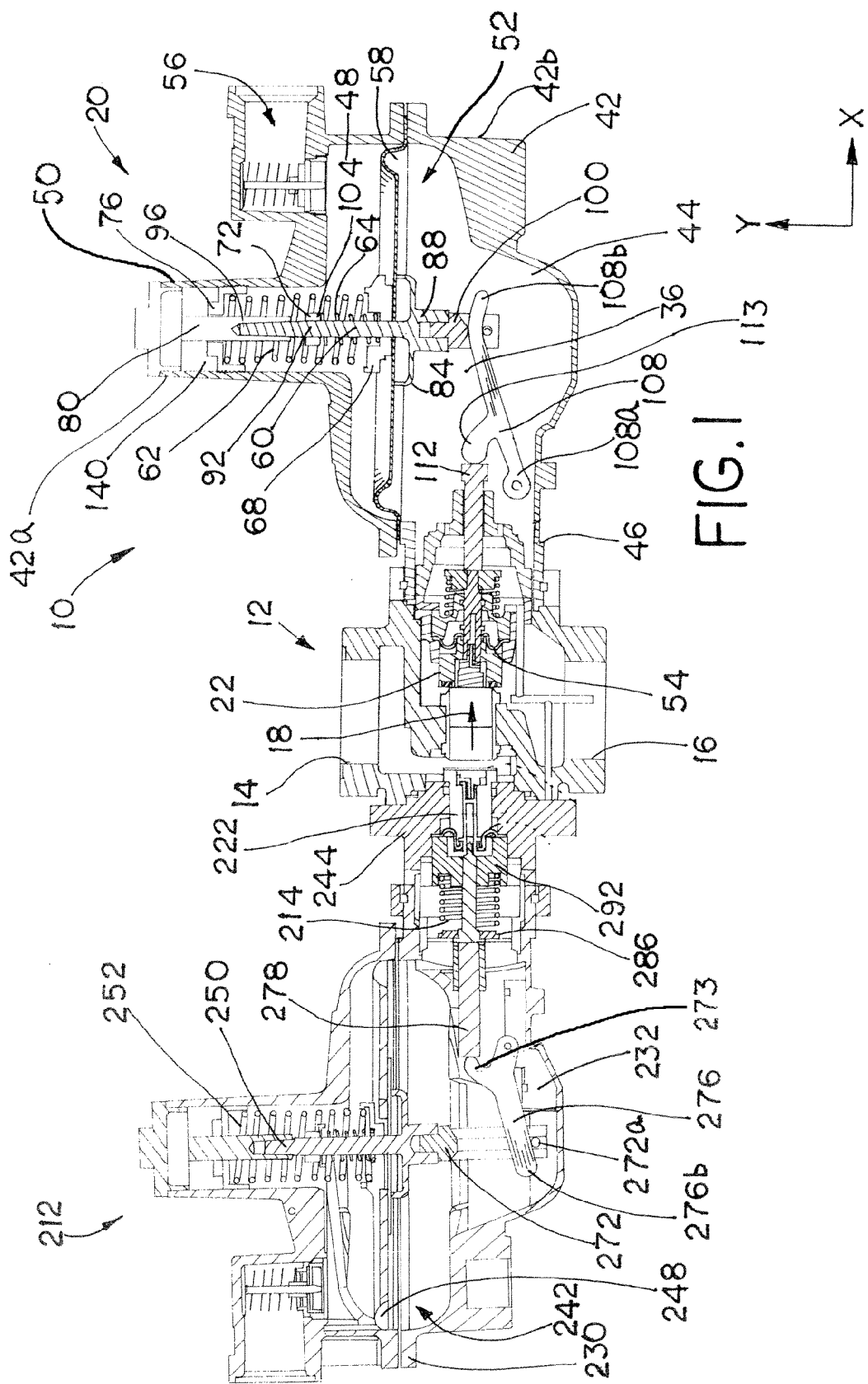
FIG. 1 is a side cross-sectional view of an embodiment of a fluid regulating device in an open position.
Figure 2:
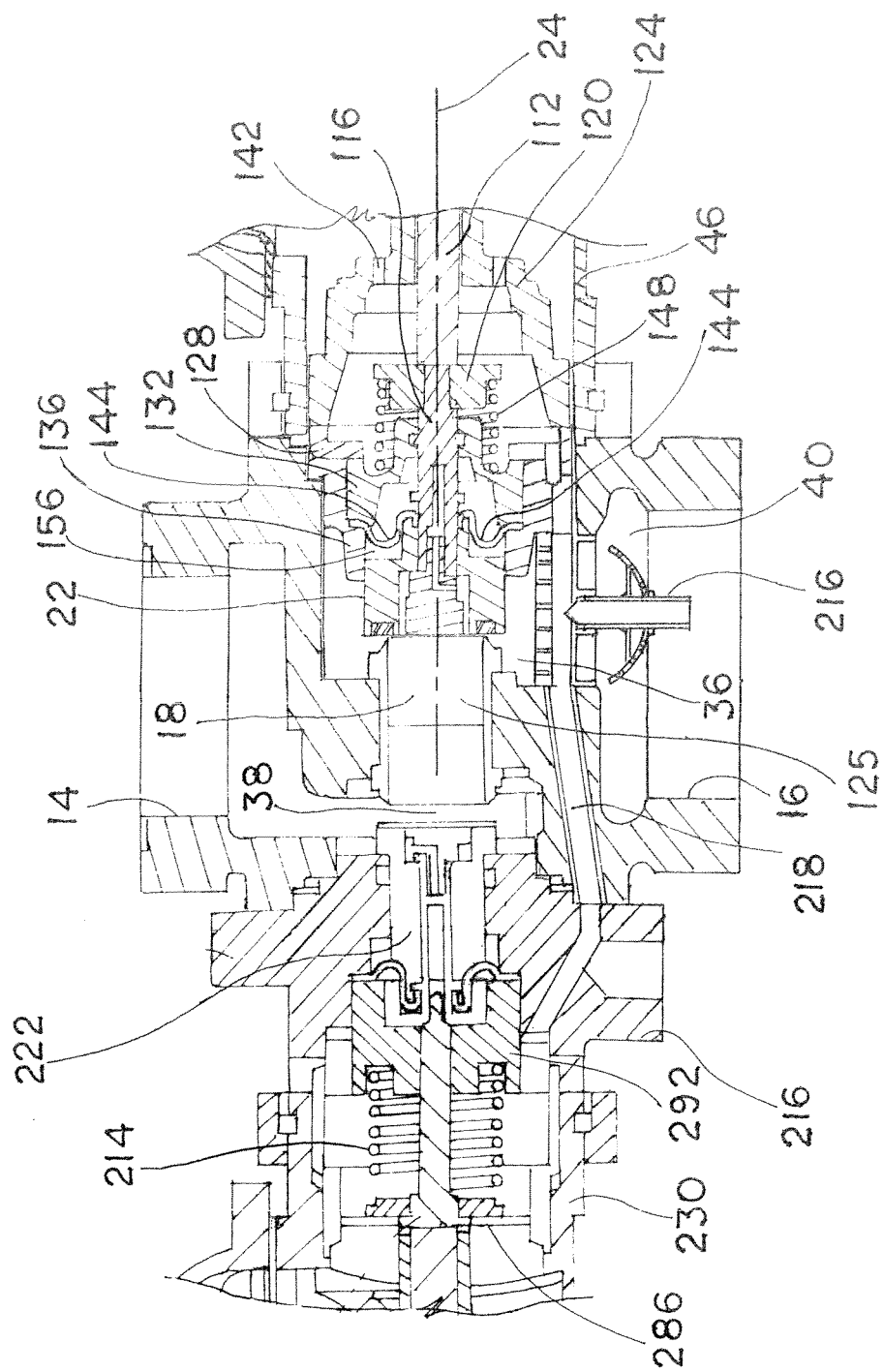
FIG. 2 is a partial side cross-sectional view of the valve disc and valve port of the fluid regulating device of FIG. 1.
Figure 3A:
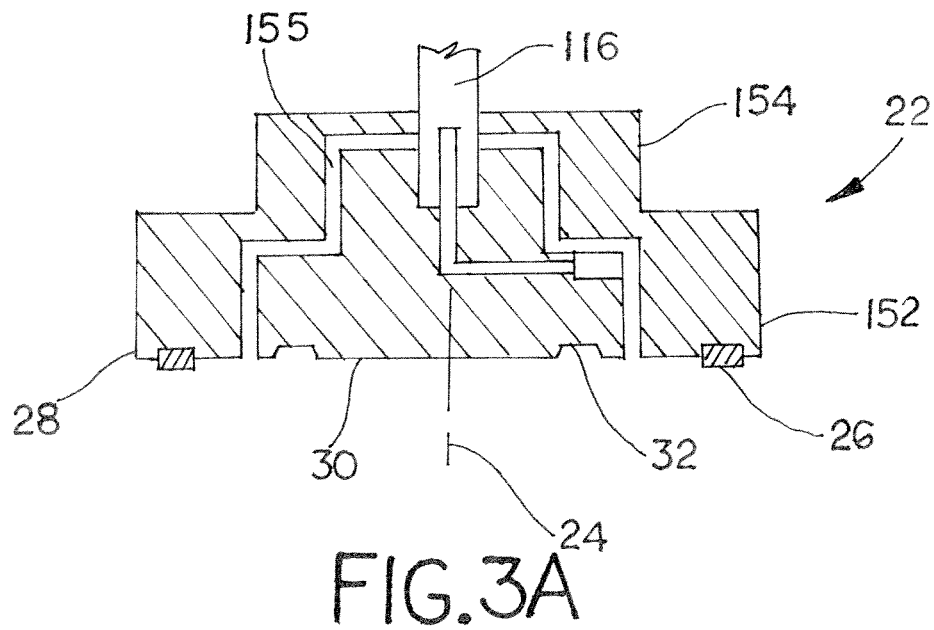
FIG. 3A is a side cross-sectional view of an embodiment of the valve disc.

FIGS. 1 and 2 illustrate a fluid regulating device 10 including a regulator valve 12 having an inlet 14, an outlet 16, and a valve port 18 disposed between the inlet 14 and the outlet 16. An actuator 20 is coupled to the regulator valve 12 and includes a valve disc 22, the valve disc 22 disposed within the regulator valve 12 and adapted for displacement along a longitudinal axis 24 between a closed position sealingly engaging the valve port 18 and an open position disposed away from the valve port 18. As shown in FIG. 3A, the valve disc 22 includes a sealing surface 26 disposed adjacent to an outer radial end 28 of the valve disc 22, the sealing surface 26 adapted to sealingly engage the valve port 18 in the closed position. The valve disc 22 also includes an intermediate surface 30 disposed inward of the sealing surface 26.

Figure 3B:
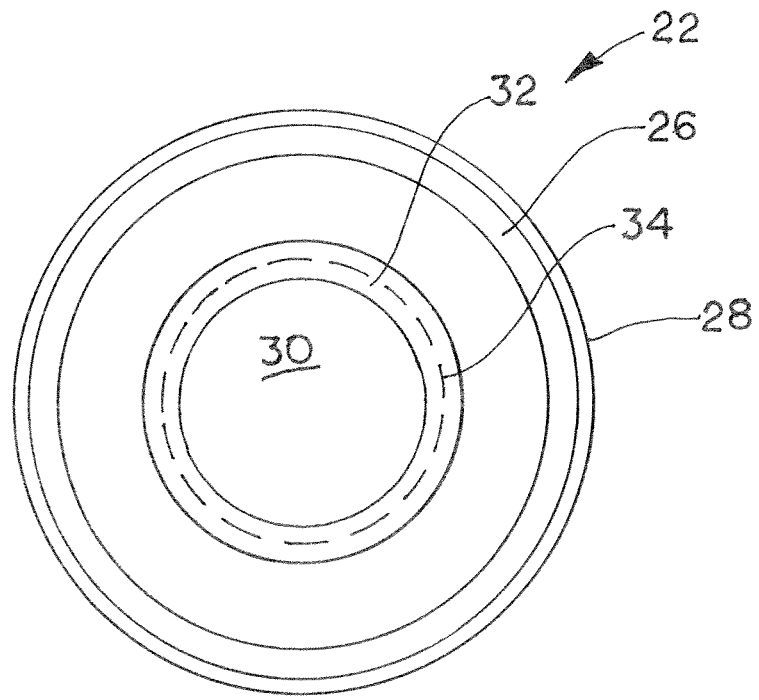
FIG. 3B is a bottom view of the embodiment of the valve disc of FIG. 3A.
Figure 4:
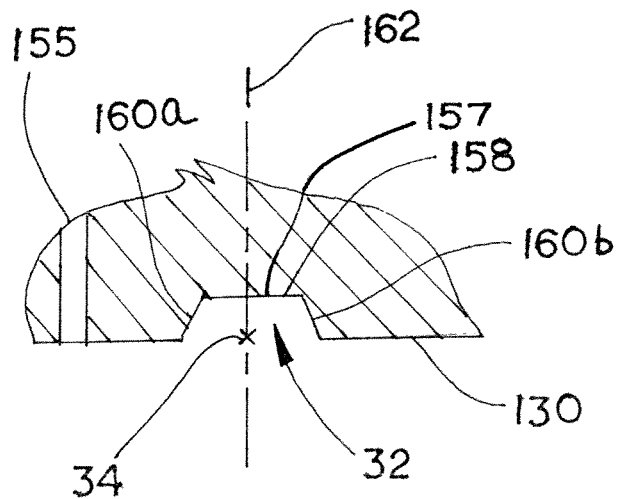
FIG. 4 is a partial side cross-sectional view of a groove of the embodiment of the valve disc of FIG. 3A.

As illustrated in FIGS. 3A, 3B, and 4, the valve disc 22 further includes a groove 32 formed in the intermediate surface 30, the groove 32 extending along a groove axis 34 extending along the intermediate surface 30 normal to the longitudinal axis 24, the groove axis 34 being at least partially curved when viewed along the longitudinal axis 24. In such a configuration, "boost" can be increased at a high inlet pressure, thereby advantageously decreasing capacity through the regulator.

Figure 5A:
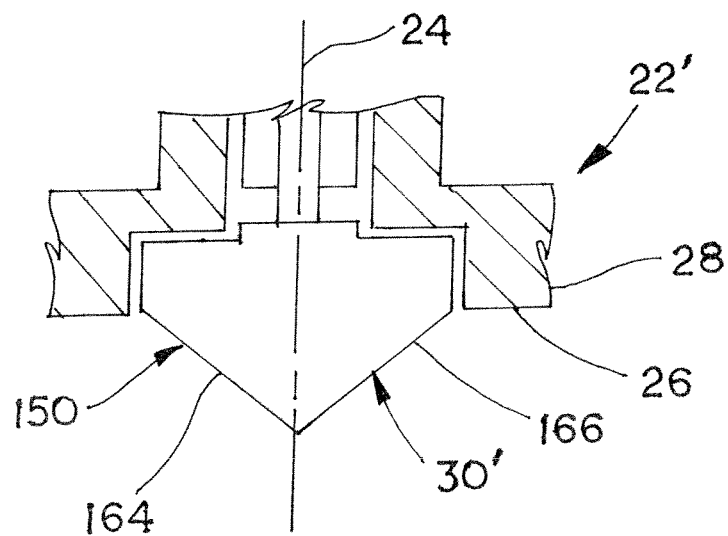
FIG. 5A is a partial side cross-sectional view of a further embodiment of the valve disc.
Figure 5B:
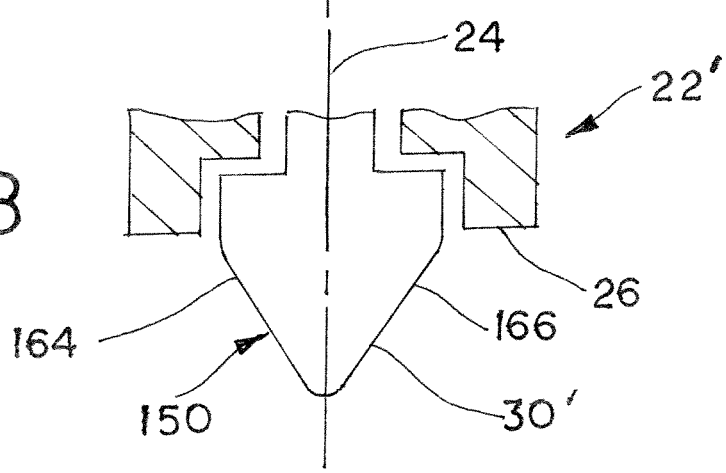
FIG. 5B is a partial side cross-sectional view of a still further embodiment of the valve disc.

In alternative embodiments illustrated in FIGS. 5A and 5B, the intermediate surface 30' disposed radially inward of the sealing surface 26, and the intermediate surface 30' includes a protrusion 150 that extends along the longitudinal axis 24 towards the valve port 18. In this embodiment, a cross-section of the intermediate surface 30' includes a first edge 164 and a second edge 166, and the first edge 164 and the second edge 166 converge as the intermediate surface 30' extends towards the valve port 18. So configured, "boost" can be reduced at a low inlet pressure, thereby advantageously increasing capacity through the regulator.

Turning to the fluid regulating device 10 in more detail, the fluid regulating device 10 includes the actuator 20 and the regulator valve 12, as illustrated in FIGS. 1 and 2. The regulator valve 12 includes the inlet 14 for receiving gas from a gas distribution system, for example, and the outlet 16 for delivering gas to a facility having one or more appliances, for example. The actuator 20 is coupled to the regulator valve 12 and includes a control assembly 36 having a control element, such as a valve disc 22. During a first or normal operational mode, the control assembly 36 senses the pressure at the outlet 16 of the regulator valve 12 (i.e., the outlet pressure) and controls a position of the valve disc 22 such that the outlet pressure approximately equals a predetermined setpoint or control pressure.

With reference to FIGS. 1 and 2, the regulator valve 12 defines a throat 38 and a valve mouth 40. The throat 38 is disposed between the inlet 14 and the outlet 16, and has the valve port 18 disposed therein. Fluid must travel through the valve port 18 to travel between the inlet 14 and the outlet 16 of the regulator valve 12. The valve port 18 may be removable from the regulator valve 12 such that it may be replaced with a different valve port having a bore of a different diameter or configuration to tailor operational and flow characteristics of the regulator valve 12 to a specific application. In the disclosed embodiment, the valve mouth 40 defines an opening disposed along an axis that is generally parallel to the horizontal longitudinal axis 24 (i.e., along the X axis of the reference coordinate system provided in FIG. 1) and that is generally perpendicular to a vertical longitudinal axis (i.e., an axis disposed along or parallel to the Y axis of the reference coordinate system provided in FIG. 1) of the inlet 14 and outlet 16 of the regulator valve 12.

Referring to FIG. 1, the actuator 20 includes a housing 42 and the control assembly 36, as discussed above. The housing 42 includes an upper housing component 42*a* and a lower housing component 42*b* secured together with a plurality of fasteners, for example. The lower housing component 42*b* defines a control cavity 44 and an actuator mouth 46. The actuator mouth 46 is connected to the valve mouth 40 of the regulator valve 12 to provide fluid communication between the actuator 20 and the regulator valve 12. The upper housing component 42*a* defines a relief cavity 48 and a tower portion 50 for accommodating a portion of the control assembly 36, as will be described.

The control assembly 36 includes a diaphragm subassembly 52, a disc and balancing subassembly 54, and a release valve 56. The diaphragm subassembly 52 includes a diaphragm 58, a piston 60, a control spring 62, a relief spring 64, a combination spring seat 68, a relief spring seat 72, a control spring seat 76, and a piston guide 80. More particularly, the diaphragm 58 includes a disc-shaped diaphragm defining an opening through a central portion thereof. The diaphragm 58 is constructed of a flexible, substantially air-tight, material and its periphery is sealingly secured between the upper and lower housing components 42*a*, 42*b* of the housing 42. The diaphragm 58 therefore separates the relief cavity 48 from the control cavity 44.

The combination spring seat 68 is disposed on top of the diaphragm 58 and defines an opening disposed concentric with the opening in the diaphragm 58. As depicted in FIG. 1, the combination spring seat 68 supports the control spring 62 and the relief spring 64.

The piston 60 of the disclosed embodiment includes a generally elongated rod-shaped member having a sealing cup portion 84, a yoke 88, a threaded portion 92, and a guide portion 96. The sealing cup portion 84 is concaved and generally disc-shaped and extends circumferentially about a mid-portion of the piston 60, and is located just below the diaphragm 58. The yoke 88 includes a cavity adapted to accommodate a coupler 100 which connects to a portion of the disc and balancing subassembly 54 to enable attachment between the diaphragm subassembly 52 and the disc and balancing subassembly 54, as will be described.

The guide portion 96 and the threaded portion 92 of the piston 60 are disposed through the openings in the diaphragm 58 and the combination spring seat 68, respectively. The guide portion 96 of the piston 60 is slidably disposed in a cavity in the piston guide 80, which maintains the axial alignment of the piston 60 relative to the remainder of the control assembly 36. The relief spring 64, the relief spring seat 72, and a nut 104 are disposed on the threaded portion 92 of the piston 60. The nut 104 retains the relief spring 64 between the combination spring seat 68 and the relief spring seat 72. The control spring 62 is disposed on top of the combination spring seat 68, as mentioned, and within the tower portion 50 of the upper housing component 42*a*. The control spring seat 74 is threaded into the tower portion 50 and compresses the control spring 62 against the combination spring seat 68. In the disclosed embodiment, the control spring 62 and the relief spring 64 include compression coil springs. Accordingly, the control spring 62 is grounded against the upper housing component 42*a* and applies a downward force to the combination spring seat 68 and the diaphragm 58. The relief spring 64 is grounded against the combination spring seat 68 and applies an upward force to the relief spring seat 72, which in turn is applied to the piston 60. In the disclosed embodiment, the force generated by the control spring 62 is adjustable by adjusting the position of the control spring seat 74 in the tower portion 50, and therefore the control pressure of the regulator 10 is also adjustable.

The control spring 62 acts against the pressure in the control cavity 44, which is sensed by the diaphragm 58. As stated, this pressure is the same pressure as that which exists at the outlet 16 of the regulator valve 12. Accordingly, the force applied by the control spring 62 sets the outlet pressure to a desired setpoint or control pressure for the regulator 10. The diaphragm subassembly 52 is operably coupled to the valve disc 22 and balancing subassembly 54, as mentioned above, via the yoke 88 of the piston 60 and the coupler 100, and by a control arm 108.

The disc and balancing subassembly 54 includes an actuator stem 112 that is engaged by the control arm 108 to move the valve disc 22 between the open and closed positions as the diaphragm 58 flexes due to variations in the downstream pressure. Specifically, the actuator stem 112 is a generally linear rod having an end surface engaged by the control arm 108. The control arm 108 is a slightly curved rod and includes a fulcrum end 108a and a free end 108b. The fulcrum end 108a is pivotally coupled to the lower housing component and includes a finger 113 having a rounded end and engaging the end surface of the actuator stem 112. The free end 108b is received between a top portion and a pin of the coupler 100 that is attached to the yoke 88 of the piston 60. Thus, the coupler 100 and the control arm 108 operably connect the disc and balancing subassembly 54 to the diaphragm subassembly 52.

As illustrated in FIG. 2, the valve disc 22 of the disc and balancing subassembly 54 is operatively connected to the actuator stem 112, and includes the sealing surface 26 that engages the outlet of the valve port 18 to cut off the fluid flow through the regulator valve 12. The valve disc 22 may be directly or indirectly connected to the actuator stem 112 by a balanced port stem 116 (that is secured to the valve disc 22) and a balancing spring seat 120, and the combined elements are supported for linear movement by a stem guide 124, a retainer plate 128, a balancing diaphragm retainer 132 and a balancing port housing 136. The stem guide 124 is configured to fit within the actuator mouth 46, and includes a generally cylindrical inner portion that slidably retains the actuator stem 112. The stem guide 124 further includes channels 142 therethrough forming a portion of the path placing the outlet 16 in fluid communication with control cavity 44 as discussed further below.

Referring to FIG. 2, the stem guide 124 engages the retainer plate 128, which is disposed between the stem guide 124 and balanced port housing 136, to hold the retainer plate 128 and balanced port housing 136 in place within the valve mouth 126. The retainer plate 128 is generally circular and includes a central opening through which the balanced port stem 116 passes. The balanced port housing 136 is generally cylindrical and hollow, extends toward the valve port 18, and has an inner diameter sized to slidably receive the valve disc 22. The diaphragm retainer 132 is disposed within the balanced port housing 136 and the opening of the retainer plate 128, and is held in place between a surface of the retainer plate 128 and an inner shoulder of the balanced port housing 136. A disc-shaped balancing diaphragm 144 having a central opening is provided within the balanced port housing 136. The balancing diaphragm 144 is constructed of a flexible, substantially air-tight, material and its periphery is secured between the diaphragm retainer 132 and the balanced port housing 136. The inner edge at the central opening of the balancing diaphragm 144 is sealingly secured between the valve disc 22 and the balanced port stem 116. So configured, a first cavity 156 is formed between a second end 154 of the valve disc 22, the diaphragm retainer 132, and a surface of the balancing diaphragm 144.

The valve disc 22, the balanced port stem 116 secured to the valve disc 22, and the actuator stem 112 may be biased toward the open position of the regulator valve 12 by a balancing spring 148 disposed between the balancing spring seat 120 and a seating surface of the diaphragm retainer 132. More specifically, the seating surface of the diaphragm retainer 132 may be adapted to seat a first end of the balancing spring 148 and a second end of the balancing spring 148 may be adapted to engage a portion of the balancing spring seat 120, as illustrated in FIG. 2. The balancing spring 148 may be any suitable resilient member, such as a coil spring that is coaxially aligned with the longitudinal axis 24. Because the seating surface of the diaphragm retainer 132 is stationary, the second end of the balancing spring 148 biases the balancing spring seat 120 into engagement with the actuator stem 112. The balancing spring 148 may be pre-stressed to provide a suitable biasing force regardless of the position of the actuator stem 112. Moreover, the balancing spring 148 may be chosen from a plurality of balancing springs that each have a unique spring characteristics (e.g., spring force) to tune the disc and balancing subassembly 54 to achieve desired flow conditions.

As illustrated in FIG. 3A, the valve disc 22 of the valve disc includes the sealing surface 26 that disposed at a first end 152 of the valve disc 22, and the first end 152 is longitudinally opposite the second end 154 of the valve disc 22. The sealing surface 26 is disposed adjacent to the outer radial end 28 of the valve disc 22, and the sealing surface 26 is adapted to sealingly engage the valve port 18 in the closed position. The sealing surface 26 may be a portion of a sealing insert secured within a cavity formed in the valve disc 22 or may be a surface on the valve disc 22 itself. The sealing surface 26 may include any suitable material or combination of materials, such as a resilient, compressible material. The intermediate surface 30 is disposed radially inward of the sealing surface 26 (i.e., in a radial direction towards the longitudinal axis 24) towards the first end 152 of the valve disc 22. The intermediate surface 30 may be a portion of an insert secured to the valve disc 22 or may be a surface on the valve disc 22 itself. The valve disc 22 may further include one or more disc passages 155 that may longitudinally extend through the valve disc 22 from the first end 152 to the second end 154 such that the first cavity 156 is in fluid communication with the area adjacent to outlet 125 of the valve port 18. The one or more disc passages 155 may be formed as a combination of one or more cylindrical passageways and one or more planar passageways that extend through the valve disc 22. In addition, one or more of the disc passages 155 may at least partially include elongated longitudinal passageways having any suitable cross-sectional shape (such as a round, ovular, or polygonal, for example).

With the valve disc 22 in the open position, fluid flows through the one or more disc passages 155 from the outlet 125 of the valve port 18 into the first cavity 156 and into contact with the balancing diaphragm 144. As such, the one or more disc passages 155 are configured to place the surface of the balancing diaphragm 144 opposite the valve port 18 in fluid communication with the upstream pressure bearing on the valve disc 22. Accordingly, the balancing diaphragm 144 provides a force on the valve disc 22 in the direction of the valve port 18 to compensate for the force applied to the valve disc 22 due to the upstream pressure of the fluid passing through the valve port 18. The components of the disc and balancing subassembly 54 are configured so that the force applied by the balancing diaphragm 144 is approximately opposite and equal to the force of the upstream pressure on the valve disc 22 to eliminate any influence of the upstream pressure on the diaphragm subassembly 52 and thereby allowing for more accurate control of the downstream pressure by the fluid regulating device 10.

Referring to FIGS. 3A and 3B, the valve disc 22 may include the groove 32 formed in the intermediate surface 30, and the groove 32 may extend along the groove axis 34 extending along (or adjacent to) the intermediate surface 30 normal to the longitudinal axis 24. The groove axis 24 may be at least partially curved when viewed along the longitudinal axis 24. For example, the groove axis 34 may have a circular shape or a partially-circular shape when viewed along the longitudinal axis 24, as illustrated in FIG. 3B. The circular shape or a partially-circular shape may be concentric with the longitudinal axis 24. The groove 32 may have any suitable cross-sectional shape or combination of shapes when viewed along the groove axis 34. For example, as illustrated in FIGS. 3A and 4, the cross-sectional shape of the groove 32 may have a top wall 157 that is normal to the longitudinal axis when viewed along the groove axis 34, the top wall being longitudinally offset from the intermediate surface 130 towards the second end 154 of the valve disc 22. The top wall 157 may be linear when viewed in cross-section, or may be curved or partially curved when viewed in cross-section. The top wall 157 may form a cross-sectional portion of a planar surface 158 that extends along the groove axis 34 and that may be normal or substantially normal to the longitudinal axis 24.

Referring again to FIGS. 3A and 4, the cross-sectional shape of the groove 32 may have a first side wall 160a and a second side wall 160b that each inwardly taper as each of the first and second side walls 160a, 160b extends away from the intermediate surface 130 and towards the top wall 157. So configured, the groove 32 has a trapezoidal cross-sectional shape when viewed normal to the groove axis 34. The trapezoidal cross-sectional shape may be symmetrically formed about an axis 162 normal to the groove axis 34. Instead of a trapezoid, the cross-sectional shape of the groove 32 may be rectangular or substantially rectangular, with the first and second side walls 160a, 160b being parallel. Alternatively, the groove 32 may have an at least partially curved cross-sectional shape when viewed normal to the groove axis 34. That is, the groove 32 may have the cross-sectional shape of a portion of an oval and/or of a portion of a circle. Further still, the groove 32 may have the cross-sectional shape of a triangle or any other polygon. When viewed in cross-section along the groove axis 34, the intersection of the top wall 157 and first and second side walls 160a, 160b may be radiused, rounded, chamfered, etc. Alternatively, the top wall 157 and first and second side walls 160a, 160b may directly intersect to form an edge. The groove 32 may have a constant cross-sectional shape along the entire length of the groove 32 when viewed along the groove axis 34. Alternatively, the cross-sectional shape of the groove may vary along the groove axis 34.

Alternative embodiments of a valve disc 22' are illustrated in FIGS. 5A and 5B. These embodiments may be identical or substantially identical to the embodiments of the valve disc 22 illustrated in FIGS. 1 to 4, with the exception being that the intermediate surface 30' disposed radially inward of the sealing surface 26 includes a protrusion 150 that extends along the longitudinal axis 24 towards the valve port 18 (and towards the second end 154 of the valve disc 22'). For example, a cross-section of the intermediate surface 30' viewed normal to the longitudinal axis 24 includes the first edge 164 and the second edge 166, and the first edge 164 and the second edge 166 may converge as the intermediate surface 30' extends towards the valve port 18.

The first edge 164 and the second edge 166 may be linear or partially linear, or may be curved or partially curved. Accordingly, the intermediate surface 30' may be at least partially conical in shape. In the embodiment illustrated in FIG. 5A, the intermediate surface 30' has the shape of a cone, and the tip of the cone may be pointed or rounded. A base of the cone may have a radial length that is between three times the longitudinal height of the cone and equal to the longitudinal height of the cone. Alternatively, the intermediate surface 30' may have a cross-section shape of a parabola, as illustrated in FIG. 5B. A radial width of the parabola may be between three times the longitudinal height of the parabola and equal to the longitudinal height of the parabola. The intermediate surface 30' may be symmetrically formed about the longitudinal axis 24 or may be asymmetrically formed.

As illustrated in FIG. 1, the fluid regulating device 10 may optionally include a secondary device in the form of an overpressure monitor 212 that operates to cut off the fluid flow through the regulator valve 12 in an overpressure situation until the downstream pressure is reduced after a failure of the actuator 20. The monitor 212 in the illustrated embodiment has a similar configuration as the actuator 20, and the monitor 212 also operates in a similar manner as the actuator 20. Because the monitor 212 only responds in the event that the downstream pressure exceeds a cutoff pressure established by a diaphragm 248 and a control spring 252, a monitor diaphragm subassembly 242 and a disc and balancing subassembly 244 are configured accordingly. A balancing spring 214 disposed between a spring seat 286 and a diaphragm retainer 292 biases a valve disc 222 to the normal open position. A coupler 272 and a control arm 276 are configured so that the coupler 272 only drives the control arm 276 in the direction to move the valve disc 222 toward the closed position and into engagement with the upstream side of the valve port 18 to cut off the fluid flow through the regulator valve 12. A pin 272a of the coupler 272 engages the free end 276b of the control arm 276 to rotate the control arm 276 when the diaphragm 248 and a piston 250 move upward due to a downstream pressure exceeding the cutoff pressure. Conversely, a top portion 273 of the coupler 272 is disposed remotely from the control arm 276 so the downward movement of the diaphragm 248 and piston 250 caused by decreases in the downstream pressure do not cause movement of the control arm 276. Of course, alternate configurations of overpressure monitors are known to those skilled in the art, including monitors configured to close when the downstream pressure drops below a low pressure cutoff, and are contemplated by the inventors as having use in gas regulators in accordance with the present disclosure.

When an operating demand is placed on the gas distribution system, e.g., a user begins operating an appliance such as a furnace, a stove, etc., the appliance draws gas from the outlet 16 and correspondingly the control cavity 44 of the actuator 20 and the control cavity 232 of the monitor 212, thereby reducing the pressure that is sensed by the diaphragms 58, 248. As the pressure sensed by the diaphragm 58 decreases, a force imbalance occurs between a control spring force and an outlet pressure force on the diaphragm 58 such that the control spring 62 expands and displaces the diaphragm 58 and piston 60 downward relative to the housing 42. This causes the control arm 108 to pivot in the clockwise direction, which in turn rotates the finger 113 relative to the surface of the actuator stem 112. This allows the actuator stem 112 and the valve disc 22 to move away from the outlet 125 of the valve port 18 due to the force of the balancing spring 148 to open the regulator valve 12. At the same time, the pressure decrease may also cause a force imbalance to occur between a control spring force and an outlet pressure force on the diaphragm 248 such that the control spring 252 expands and displaces the diaphragm 248 and piston 250 downward relative to the housing 230. However, because the upper portion of the coupler 272 is disposed remotely from the control arm 276, the monitor 212 does not similarly respond to the drop in pressure with movement of the valve disc 222.

When the demand is removed from the gas distribution system, such as when the user shuts off the appliance, the regulator 10 initially responds by decreasing the fluid flow through the regulator valve 12. As gas continues to flow through the valve port 18 and to the downstream portion of the system, the pressure increases at the outlet 16 and, correspondingly, in the control cavity 44 of the actuator 20 and the control cavity 232 of the monitor 212. As the pressure sensed by the diaphragm 58 increases and overcomes the control spring force, the diaphragm 58 and piston 60 are forced upward relative to the housing 42. The upward movement causes the control arm 108 to pivot in the counterclockwise direction, which in turn drives the actuator stem 112 and the valve disc 22 toward the valve port 18 to reduce the fluid flow through the regulator valve 12. Under normal operating conditions, the outlet pressure will drop to approximately the actuator setpoint pressure and remain there until the downstream demand changes in a manner that causes a response from by the actuator 20.

The monitor cutoff pressure is greater than the actuator setpoint pressure, and the monitor 212 does not typically respond to pressure variations within the normal operating range of the fluid regulating device 10. In the event of a failure of the actuator 20 such as, for example, the rupturing of the diaphragm 58, the valve disc 22 may remain open despite increases in the downstream pressure beyond the actuator setpoint pressure. Eventually, the pressure at the sensing point of the Pitot tube 216 reaches the cutoff pressure of the monitor 212. The downstream pressure communicated to the control cavity 232 by the monitor branch 218 causes a force imbalance to occur between the control spring force and the outlet pressure force on the diaphragm 248 such that the control spring 252 contracts and displaces the diaphragm 248 and piston 250 upward relative to the housing 230. When the piston 250 moves, the pin 272a of the coupler 272 rotates the control arm 276 to drive the actuator 278 and move the valve disc 222 into engagement with the valve port 18 to shut off the fluid flow through the regulator valve 12. The monitor 212 will continue to stop the fluid flow as long as the pressure at the sensing point of the Pitot tube 216 remains above the monitor cutoff pressure.

In operation, when the valve disc 22 is in the open position (i.e., when the sealing surface 156 of the valve disc 22 does not sealingly engage the valve port 18), fluid flows from the inlet 14 to the outlet 16 through the valve port 18. While in the open position, a portion of the fluid flowing from the inlet 14 to the outlet 16 passes through the one or more disc passages 155 and enters the first cavity 156. The fluid within the first cavity 156 then comes into contact with the balancing diaphragm 144 such that the surface of the balancing diaphragm 144 opposite the valve port 18 in fluid communication with the upstream pressure bearing on the valve disc 22. In embodiments of the valve disc 22 that include the groove 32 formed in the intermediate surface 30 (as illustrated in FIGS. 3A and 3B), the groove profile improves "boost" at high inlet pressures by distributing the inlet pressure as it acts on the valve disc 22, thereby changing the balanced port inlet pressure sense and, as a result, increasing capacity in the fluid regulating device 10. In alternative embodiments of the valve disc 22' illustrated in FIGS. 5A and 5B, the protrusion 150 acts to reduce "boost" at low inlet pressures by redirecting flow as it acts on the valve disc 22, thereby decreasing capacity in the fluid regulating device 10. Also, by providing a plurality of balancing springs 148 that each have a unique spring characteristics (e.g., spring force), a desired valve disc 22, 22' can be shipped with a desired balancing springs 148 to provide a customizable set that tunes the disc and balancing subassembly 54 to achieve desired flow conditions.

While certain representative embodiments and details have been shown for purposes of illustrating the invention, it will be apparent to those skilled in the art that various changes in the methods and apparatus disclosed herein may be made without departing from the scope of the invention.

What is claimed:

1. A fluid regulating device, comprising:
    a regulator valve having an inlet, an outlet, and a valve port disposed between the inlet and the outlet;
    an actuator coupled to the regulator valve and comprising a valve disc, the valve disc disposed within the regulator valve and adapted for displacement along a longitudinal axis between a closed position sealingly engaging the valve port and an open position disposed away from the valve port, the valve disc extending along the longitudinal axis from a first end to a second end;
    the valve disc including:
    a sealing surface disposed adjacent to an outer radial end of the valve disc, the sealing surface adapted to sealingly engage the valve port in the closed position;
    an intermediate surface disposed radially inward of the sealing surface; and
    a groove formed in the intermediate surface, the groove extending along a groove axis extending along the intermediate surface normal to the longitudinal axis, the groove axis being at least partially curved when viewed along the longitudinal axis, wherein one or more disc passages longitudinally extend through the valve disc from the first end to the second end of the valve disc, and wherein a first end of the at least one disc passage is disposed adjacent to the first end of the valve disc and the first end of the at least one disc passage is radially disposed between the sealing surface and the groove.

2. The fluid regulating device of claim 1, wherein the groove axis has a circular shape when viewed along the longitudinal axis.

3. The fluid regulating device of claim 1, wherein the groove axis has a partially-circular shape when viewed along the longitudinal axis.

4. The fluid regulating device of claim 1, wherein groove has a constant cross-sectional shape when viewed along the groove axis.

5. The fluid regulating device of claim 1, further comprising a balancing spring acting on a portion of the valve disc to bias the valve disc into the open position.

6. The fluid regulating device of claim 5, wherein the balancing spring is chosen from a plurality of balancing springs to achieve desired flow conditions through the fluid regulating device.

7. The fluid regulating device of claim 1, wherein the groove has a planar top wall that is normal to the longitudinal axis.

8. The fluid regulating device of claim 7, wherein the groove has an at least partially curved cross-sectional shape when viewed normal to the groove axis.

9. The fluid regulating device of claim 7, wherein the groove has a trapezoidal cross-sectional shape when viewed normal to the groove axis, the trapezoidal cross-sectional shape including a first side wall and a second side wall that each inwardly taper as each of the first and second side walls extends away from the intermediate surface and towards the top wall.

10. The fluid regulating device of claim 9, wherein the trapezoidal cross-sectional shape is symmetrically formed about an axis normal to the groove axis.

11. A fluid regulating device, comprising:
    a regulator valve having an inlet, an outlet, and a valve port disposed between the inlet and the outlet;
    an actuator coupled to the regulator valve and comprising a valve disc, the valve disc disposed within the regulator valve and adapted for displacement along a longitudinal axis between a closed position sealingly engaging the valve port and an open position disposed away from the valve port, the valve disc extending along the longitudinal axis from a first end to a second end;

the valve disc including:

a sealing surface disposed adjacent to an outer radial end of the valve disc, the sealing surface adapted to sealingly engage the valve port in the closed position; and an intermediate surface disposed radially inward of the sealing surface, wherein the intermediate surface includes a protrusion that extends along the longitudinal axis towards the valve port, wherein one or more disc passages longitudinally extend through the valve disc from the first end to the second end of the valve disc, and wherein a first end of the at least one disc passage is disposed adjacent to the first end of the valve disc and the first end of the at least one disc passage is radially disposed between the sealing surface and the protrusion, wherein a cross-section of the intermediate surface includes a first edge and a second edge, and the first edge and the second edge converge as the intermediate surface extends towards the valve port.

12. The fluid regulating device of claim 11, wherein the first edge and the second edge are symmetrical about the longitudinal axis.

13. The fluid regulating device of claim 11, wherein the first edge and the second edge are linear.

14. The fluid regulating device of claim 11, wherein the first edge and the second edge are at least partially curved.

15. The fluid regulating device of claim 11, wherein the intermediate surface is at least partially conical in shape.

16. The fluid regulating device of claim 15, wherein the intermediate surface has the shape of a cone, and a base of the cone may have a radial length that is between three times the longitudinal height of the cone and equal to the longitudinal height of the cone.

17. The fluid regulating device of claim 11, wherein the intermediate surface has the cross-sectional shape of a parabola.

18. The fluid regulating device of claim 17, wherein a radial width of the parabola is between three times the longitudinal height of the parabola and equal to the longitudinal height of the parabola.

19. The fluid regulating device of claim 11, further comprising a balancing spring acting on a portion of the valve disc to bias the valve disc into the open position.

20. The fluid regulating device of claim 19, wherein the balancing spring is chosen from a plurality of balancing springs to achieve desired flow conditions through the fluid regulating device.

21. A method of tuning a balanced trim assembly of a fluid regulating device, the method comprising:

selecting a balancing spring from a plurality of balancing springs, wherein each of the plurality of balancing springs has a unique spring force; and positioning the balancing spring within a fluid regulating device such that the balancing spring biases a valve disc of the balanced trim assembly away from a valve port and into an open position, the valve disc extending along the longitudinal axis from a first end to a second end, wherein the valve disc includes one of (1) a groove formed in an intermediate surface of the valve disc that is disposed inward of a sealing surface adapted to sealing engage the valve port in a closed position, the groove extending along a groove axis extending along the intermediate surface normal to a longitudinal axis extending through the valve disc, the groove axis being at least partially curved when viewed along the longitudinal axis, wherein one or more disc passages longitudinally extend through the valve disc from the first end to the second end of the valve disc, and wherein a first end of the at least one disc passage is disposed adjacent to the first end of the valve disc and the first end of the at least one disc passage is radially disposed between the sealing surface and the groove and (2) an intermediate surface disposed radially inward of a sealing surface adapted to sealing engage the valve port in a closed position, wherein the intermediate surface includes a protrusion that extends along a longitudinal axis extending through the valve disc, wherein one or more disc passages longitudinally extend through the valve disc from the first end to the second end of the valve disc, and wherein a first end of the at least one disc passage is disposed adjacent to the first end of the valve disc and the first end of the at least one disc passage is radially disposed between the sealing surface and the protrusion, wherein a cross-section of the intermediate surface includes a first edge and a second edge, and the first edge and the second edge converge as the intermediate surface extends towards the valve port.

\* \* \* \* \*